(12) United States Patent
Fine et al.

(10) Patent No.: US 10,152,269 B2
(45) Date of Patent: Dec. 11, 2018

(54) METHOD AND SYSTEM FOR PRESERVING BRANCH CACHE FILE DATA SEGMENT IDENTIFIERS UPON VOLUME REPLICATION

(71) Applicant: Dell Products L.P., Round Rock, TX (US)

(72) Inventors: Dina Fine, Herzlia (IL); Idan Robbins, Tel Aviv (IL)

(73) Assignee: Dell Products L.P., Round Rock, TX (US)

( * ) Notice: Subject to any disclaimer, the term of this patent is extended or adjusted under 35 U.S.C. 154(b) by 26 days.

(21) Appl. No.: 15/450,983

(22) Filed: Mar. 6, 2017

(65) Prior Publication Data

US 2018/0253234 A1    Sep. 6, 2018

(51) Int. Cl.
G06F 3/06    (2006.01)

(52) U.S. Cl.
CPC .............. *G06F 3/065* (2013.01); *G06F 3/067* (2013.01); *G06F 3/0619* (2013.01)

(58) Field of Classification Search
CPC .... G06F 3/0611; G06F 3/0617; G06F 3/0619; G06F 3/065; G06F 3/0656; G06F 3/067; G06F 12/0813
USPC ................................ 711/118, 145, 162, 165
See application file for complete search history.

(56) References Cited

U.S. PATENT DOCUMENTS

| 2008/0082648 | A1* | 4/2008 | Ahmed | H04L 63/126 709/223 |
| 2009/0049243 | A1* | 2/2009 | Dubrovsky | G06F 17/30902 711/118 |
| 2010/0070570 | A1* | 3/2010 | Lepeska | H04L 67/2857 709/203 |
| 2015/0237159 | A1* | 8/2015 | Lawrence | H04L 67/2814 709/213 |
| 2017/0351613 | A1* | 12/2017 | Anderson | G06F 12/0833 |

* cited by examiner

*Primary Examiner* — Gary J Portka
(74) *Attorney, Agent, or Firm* — Pearl Cohen Zedek Latzer Baratz LLP (57) ABSTRACT

A method and a system for preserving branch cache file data identifiers upon volume replication, the method including: calculating file data hashes associated with the file; storing the calculated file data hashes on a directory attached to the file; constructing file data identifiers for the file, based on the file data hashes and a secret server identifier of the first content server; providing file data of the file and the file data identifiers to the first branch cache client; caching the file data and the file data at the first branch cache client; replicating the file data hashes contained in the replicated volume; deriving the server secret identifier of the first content server; reconstructing the file data identifiers for the file, based on the replicated file data hashes and the derived server secret identifier of the first content server; providing the reconstructed file data identifiers to the branch cache clients.

19 Claims, 4 Drawing Sheets

METHOD AND SYSTEM FOR PRESERVING BRANCH CACHE FILE DATA SEGMENT IDENTIFIERS UPON VOLUME REPLICATION

FIELD OF THE INVENTION

The present invention relates generally to the field of data storage devices, and more particularly to data storage devices featuring branch cache capabilities.

BACKGROUND OF THE INVENTION

Prior to the background of the invention being set forth, it may be helpful to provide definitions of certain terms that will be used hereinafter.

The term "file" as used herein refers to a container for storing data in a file system.

The term "directory" as used herein refers to a cataloging structure which contains references to other files, and possibly other directories. The term "file" includes the term "directory".

The term "volume" or "logical drive" refers to a single accessible storage area with a single file system, In a distributed file system, files of a same volume need not necessarily stored on the same physical storage device (e.g. hard disk). From a client perspective however, files of the same volume are subject to the same rules and logic. It is the file system task to handle the management of the files on the volume in a manner that is transparent to the client of the file system.

Figure 1:
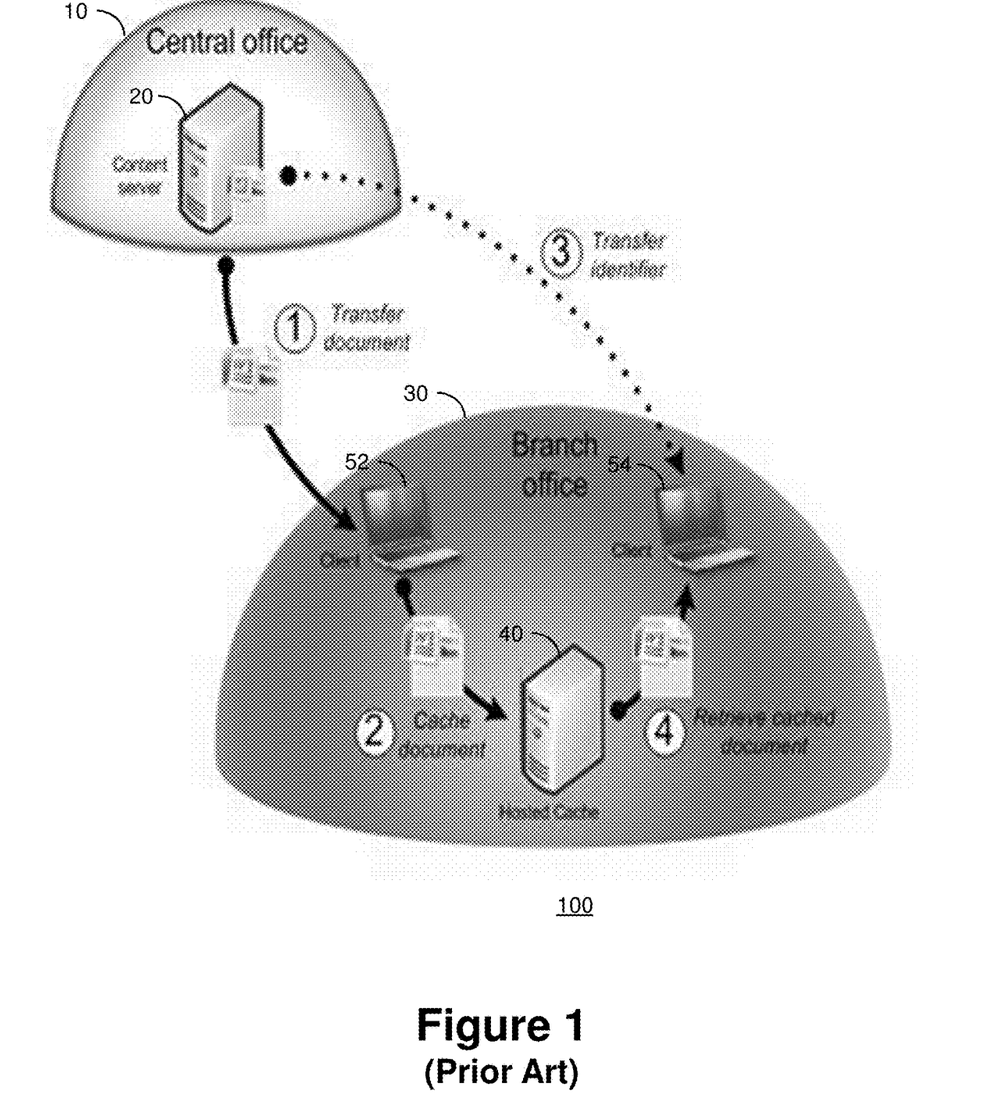
FIG. 1 is a block diagram illustrating a general Branch-Cache architecture in accordance with some embodiments of the prior art.

FIG. 1 is a block diagram illustrating a general Branch-Cache architecture in accordance with some embodiments of the prior art. BranchCache is a wide area network (WAN) bandwidth optimization technology that is included in some editions of the Windows Server 2012 and Windows 8 operating systems, as well as in some editions of Windows Server 2008 R2 and Windows 7. To optimize WAN bandwidth when users access content on remote servers, Branch-Cache reads content from the main or central office 10 and caches the content at branch office locations 30, allowing client computers 52 and 54 at branch office 30 to retrieve the data locally.

When BranchCache is configured, Windows Branch-Cache clients first retrieve content (step 1—transfer document) from the storage system and then cache the content on a computer within the branch office (step 2—cache document). If another BranchCache-enabled client in the branch office requests the same content, the storage system first authenticates and authorizes the requesting user. The storage system then determines whether the cached content is still up-to-date and, if it is, sends the client metadata about the cached content (step 3—transfer identifier). The client then uses the metadata to retrieve content directly from the local host of the cache, if such data exists locally (step 4—retrieve cached document).

BranchCache increases end user productivity by improving content query response times for clients and servers in branch offices, and can also help improve network performance by reducing traffic over WAN links.

When implementing branch cache, the client is provided with a file data segment identifier, which is constructed using hashed file segment data and a unique server secret. Normally, when the branch cache feature is enabled, the first time a client asks for content file information of a certain file, the server-side will have to calculate the hashes for that file data. The calculated hashes are relevant until the next time the file is modified. As long as the file is not modified, same data segment identifier is used to identify file segment (file data segment is 64 KB chunks). Taking the same content file, the generated data segment identifiers will differ between two different servers.

When a volume is replicated to a secondary storage, a new volume is created on the secondary file system, wherein the replicated volume is an exact read-only snapshot of the original volume. Since this is neither the same volume nor the same file server, file segment identifiers will differ between source volume and destination volume.

So, even if the replicated volume contains the same content file information of calculated files, the segment identifiers will differ. Consequently, local branch cache segment identifiers for uploaded files will not be valid anymore if accessing secondary storage for the exact same unmodified file content.

Remote branch cache clients known in the art usually re-download the file content to local branch caches when connecting to replication destinations.

Some other solutions known in the art have an ability to change the server secret manually (using configuration interface) for the whole system (all virtual volumes at once). But this solution has a drawback of not being able to use some of the volumes as standalone, active, writeable volumes of a separate server, and other for replicated content.

SUMMARY OF THE INVENTION

In order to overcome the drawbacks of the prior art, some embodiments of the present invention provide a method to preserve branch cache data identifiers for replicated storage to improve performance of branch offices when accessing secondary storage at main branch.

In accordance with some embodiments of the present invention, two different servers with different server secrets can automatically generate same branch cache identifiers for replicated content.

Some embodiments of the present invention provide a system and a method for preserving branch cache file data segment identifiers upon volume replication. The method may include the following steps: upon a first access request for a file, made by a first branch cache client to a first content server: calculating, file data segments hashes associated with the file; storing the calculated file data segments hashes on a directory attached to the file; constructing file data segment identifiers for the file, based on the file data segments hashes and a secret server identifier (SSID) of the first content server; providing file data of the file and the file data segment identifiers to the first branch cache client; caching the file data and the file data segment identifiers at the first branch cache client; upon replicating a volume containing the file, from the first content server to a second content server: replicating the file data segments hashes contained in the replicated volume; deriving the SSID of the first content server; upon an access request for the file made by the first branch cache client or any other any branch cache client to the second content server: reconstructing the file data segment identifiers for the file, based on the replicated file data segments hashes and the derived SSID of the first content server; providing the reconstructed file data segment identifiers to the branch cache client that requested access to the file.

According to some embodiments of the present invention, upon promoting the replicated volume at the second content server to a primary storage, the second content server is configured to use the SSID of the second content server instead of the derived SSID of the first content server.

According to some embodiments of the present invention, upon the access request for the file made by the first branch cache client or any other any branch cache client to the second content server, the branch cache clients are configured to use the file data cached at the first branch cache client only in a case that the cached file data segment identifiers and the reconstructed file data segment identifiers provided by the second content server are identical.

According to some embodiments of the present invention, the first content server is a distributed file system wherein the file is associated with one of a plurality of clusters, and wherein the SSID of the first content server is constructed based on an identifier of the cluster associated with the file, and an identifier of the volume containing the file.

According to some embodiments of the present invention, the deriving the SSID of the first content server is achieved by replicating the SSID of the first content upon the replicating of the volume containing the file.

According to some embodiments of the present invention, the first content server is configured to repeat the calculating, the storing, and the constructing whenever the file is modified.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

According to some embodiments of the present invention, implementing the aforementioned process may be carried out by first storing the calculated hash (e.g. first 32 bytes of SHA-512 hashing algorithm) of each file segment of a file in a separate file which is stored in its attached directory, (and may be moved with it upon replication). In such way replicated volume hashes are immediately available and there is no need to calculate them.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Figure 2:
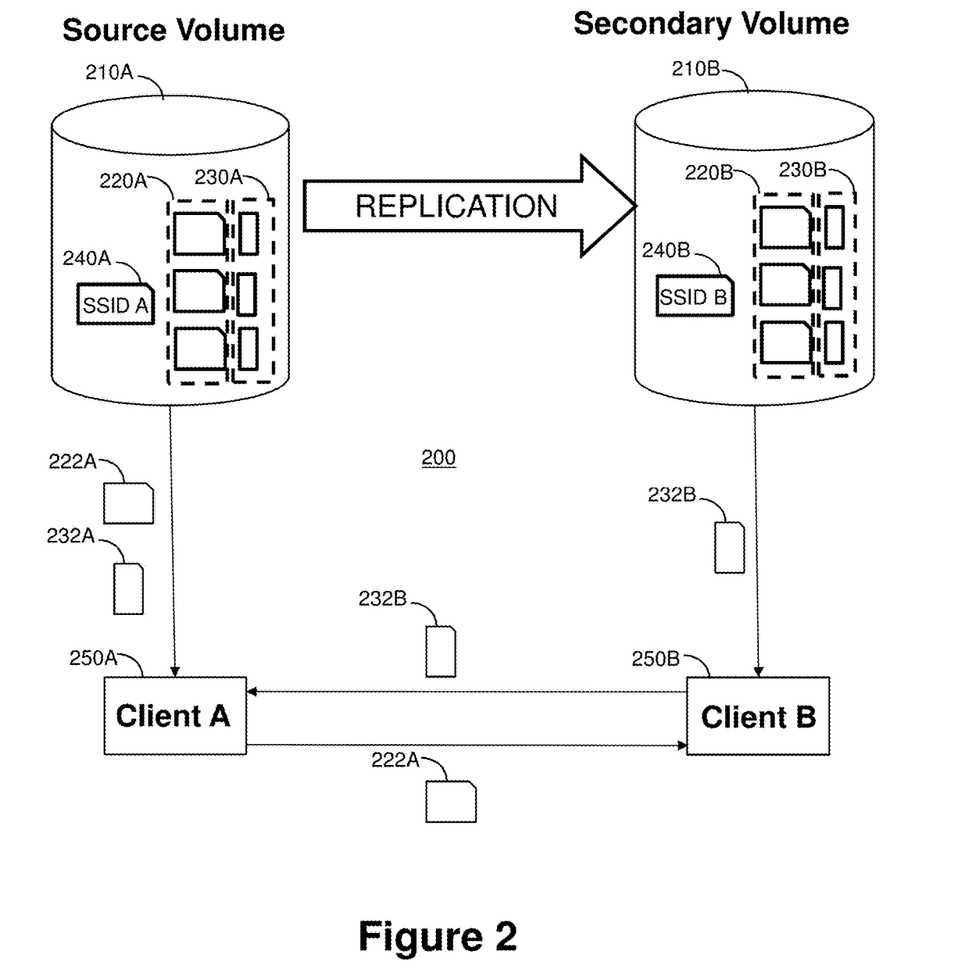
FIG. 2 is a block diagram illustrating a general Branch-Cache architecture in accordance with some embodiments of the present invention.

FIG. 2 is a block diagram illustrating a general Branch-Cache architecture in accordance with embodiments of the present invention. According to some embodiments of the present invention, there is provided a source volume 210A that can be replicated to a secondary volume 210B, while branch cache client 250A and 250B which access secondary volume 210B, get the existing content file information of the same files previously downloaded by themselves or other client peers.

In accordance with some embodiments of the present invention, source volume 210A may contain a plurality of files 220A. Whenever branch cache client A 250A requests access to one of files 220A on source volume 210A for the very first time, the storage device (not shown here) responsible for the source volume calculates file data hashes 230A and store them on a directory attached to the respective one of the files 220A on source volume 210A.

Then, a file data identifier 232A for the requested file of files 220A is constructed based on the respective calculated file data hashes of 230A and a server secret identifier 240A which is a unique identifier for the source volume 210A and the storage device on which source volume is stored. File data identifier 232A together with its respective file data file 222A are then provided to branch cache client A 250A where they are being stored.

Upon any subsequent file access request made by any of branch cache clients (e.g., 250A, 250B) to source volume 210A, source volume 210A returns only file data identifier 232A which is the same as the file data identifier 232A stored on client A 250A only case its respective file has not been modified. Then, the recently provided file data identifier 232A is compared with the one stored on branch cache client A 250A and in case they are identical, file data 232A can be downloaded from branch cache client A 250A to the requesting client (e.g., 250A, 250B).

In accordance with some embodiments of the present invention, whenever source volume 210A is replicated into a secondary volume 210B on a different storage device (not shown here), all its content, including file 220A and attached calculated file data hashes of 230A are replicated to the secondary volume 210B. The replicated files on secondary volume 210B are denoted 220B, whereas the replicated file data hashes are denoted 230B. It is noted however that secondary volume 210B has its unique server secret identifier 240B.

Whenever any of branch cache clients (e.g., 250A, 250B) makes a request to access a file to secondary volume 210B, a file data identifier 232B is reconstructed based on the respective replicated file data hashes 230B and the server secret identifier 240A of source volume 210A which has been derived (e.g. during replication). Thus, in case replicated file data hashes 230B are similar to file data hashes 230B stored on branch cache client A 250A, file data 222A can be downloaded from branch cache client A 250A rather than from secondary volume 210B, to any of requesting branch cache clients (250A, 250B).

In accordance with some embodiments of the present invention, as soon as secondary volume 210B is promoted to a standalone storage, the file data identifiers are constructed based on the server secret identifier 240B of secondary volume 210B rather than on the server secret identifier 240A of source volume 210A. This is carried out in order to enhance the security of the data stored on secondary volume 210B and also for allowing clients to treat it as a different storage.

Figure 3:
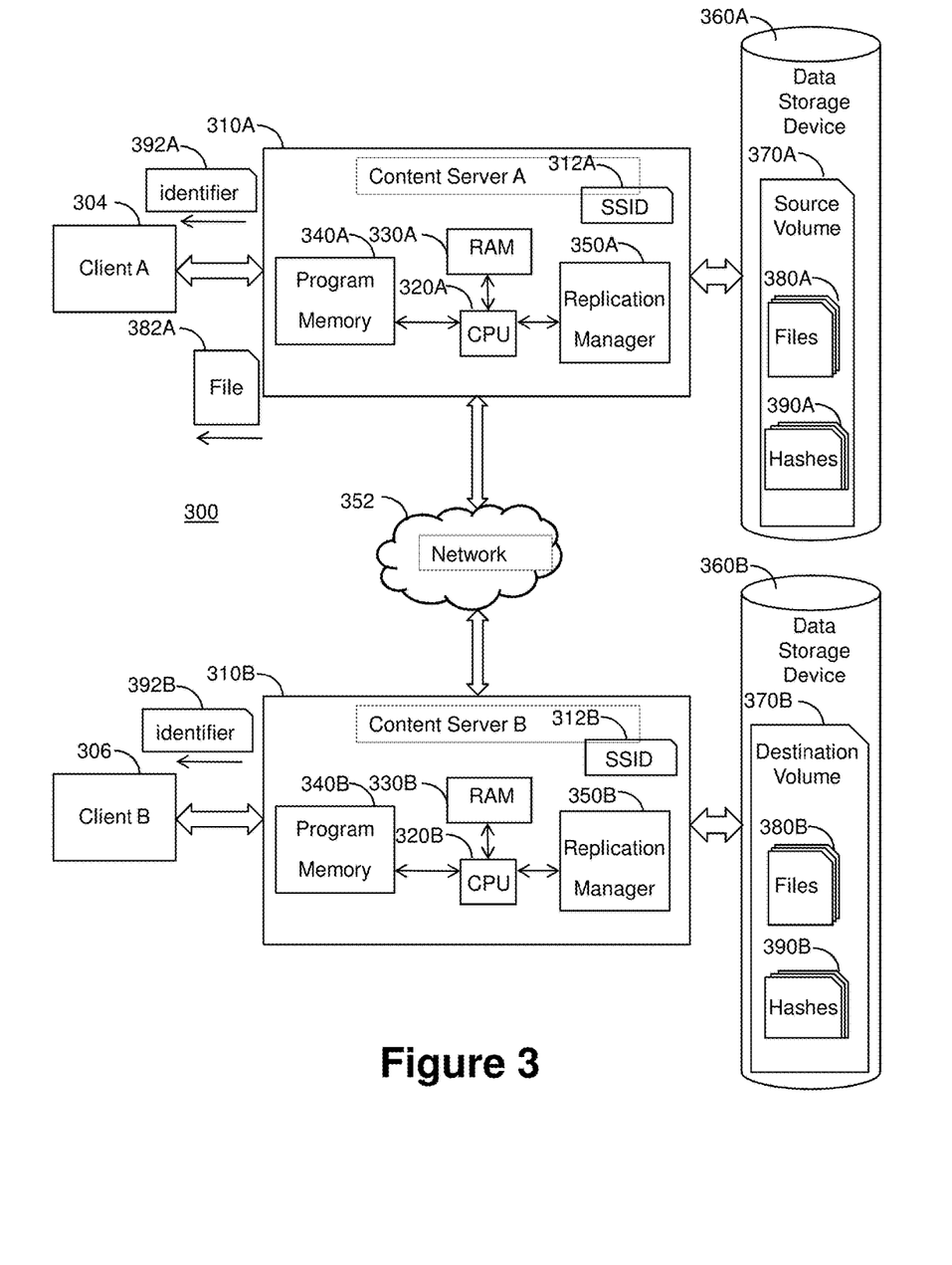
FIG. 3 is a block diagram illustrating a non-limiting exemplary system in accordance with some embodiments of the present invention.

FIG. 3 is a block diagram illustrating non-limiting exemplary architecture of a file system that is configured to implement the aforementioned logic. System 300 may include: a first content server 310A that may include a computer processor unit (CPU) 320A read only memory (RAM) 330A, and program memory 340A all operating together to enable one or more processes for managing data storage device 360A to be implemented on content server 310A. Storage device 360A may store source volume 370A in which files 380A are contained.

Content server 310A may be configured, upon a first access request for a file, made by a first branch cache client (client A) 304 to: calculate, file data segments hashes 390A associated with the requested file of files 380A. Content server 310A may be further configured to store the calculated file data segments hashes 390A on a directory attached to the requested file on source volume 370A. Content server 310A may be further configured to construct file data segment identifier 392A for the requested file, based on the file data segments hashes 390A and a secret server identifier (SSID) 312A of first content server 310A. Content server 310A may be further configured to provide file data 382A of the requested file and the file data segment identifiers 392A to first branch cache client 304.

According to some embodiments of the present invention and in accordance with Branch Cache technology, first branch cache client 304 may be configured to cache (or store) file data 382A and the file data segment identifier 393A thereon.

According to some embodiments of the present invention, system 300 may include a second content server 310B that may include a computer processor unit (CPU) 320B, read only memory (RAM) 330B, and program memory 340B all operating together to enable one or more processes for managing data storage device 360B to be implemented on content server 310B. Storage device 360B may store destination volume 370B in which files 380B are contained.

In operation, first content server 310A and second content server 310B may be configured, possibly using respective processes replication managers 350A and 350B to replicate source volume containing previously requested file 382A of files 380A, from first content server 310A to second content server 310B. Second content server 310B is configured to receive replicated file data segments hashes 380B contained in the replicated volume 370B. Second content server 310B is further configured derive SSID 312A of first content server 310A, wherein upon an access request for file 383A made by first branch cache client 304 or any other any branch cache client such as client 306 to second content server 310B, second content server 306 is configured to: reconstruct file data segment identifiers 392 for file 382A, based on replicated file data segments hashes 390B and derived SSID 312A of first content server 310A. Second content server 310B is configured to provide reconstructed file data segment identifier 392B to branch cache client 306 that requested access to file 383A.

Then, branch cache client 306 requests file data 382A from branch cache client 304 where reconstructed file data segment identifier 392B is compared with file data segment identifier 392A stored on branch cache client 304 and provided by first content server 310A. In a case they the identifiers are identical, file data 382A is downloaded from first branch cache client 304 to second branch cache client 306.

According to some embodiments of the present invention, upon promoting the replicated volume at the second content server to a primary storage, the second content server is configured to use the SSID of the second content server instead of the derived SSID of the first content server.

According to some embodiments of the present invention, upon the access request for the file made by the first branch cache client or any other any branch cache client to the second content server, the branch cache clients are configured to use the file data cached at the first branch cache client only in a case that the cached file data segment identifiers and the reconstructed file data segment identifiers provided by the second content server are identical.

According to some embodiments of the present invention, the first content server is a distributed file system wherein the file is associated with one of a plurality of clusters, and wherein the SSID of the first content server is constructed based on an identifier of the cluster associated with the file, and an identifier of the volume containing the file.

According to some embodiments of the present invention, the deriving the SSID of the first content server is achieved by replicating the SSID of the first content upon the replicating of the volume containing the file.

According to some embodiments of the present invention, the first content server is configured to repeat the calculating, the storing, and the constructing whenever the file is modified.

According to some embodiments of the present invention, implementing the aforementioned process may be carried out by first storing the calculated hash (e.g. first 32 bytes of SHA-512 hashing algorithm) of each file segment of a file in a separate file which is stored in its attached directory, (and may be moved with it upon replication). In such way replicated volume hashes are immediately available and there is no need to calculate them.

Then, the segment identifier is calculated on the fly each time a client is given content file information, using a hash function that receives as an input both server secret and the hash value of the data. For example, a function such as: HMAC (ServerSecret, HashOfData) may be used.

When a content file information is requested for a file, if such exists, and if it is then determined to be a secondary volume (determined by the file system), then the file system may retrieve the identifier of the remote volume from its metadata as well as the remote cluster identifier from the cluster's pairing information (in a file system that has paired clusters).

Consequently, the same server secret that was used for the remote volume can be constructed, and eventually provide the client the same segment identifiers that were given on the source volume.

Figure 4:
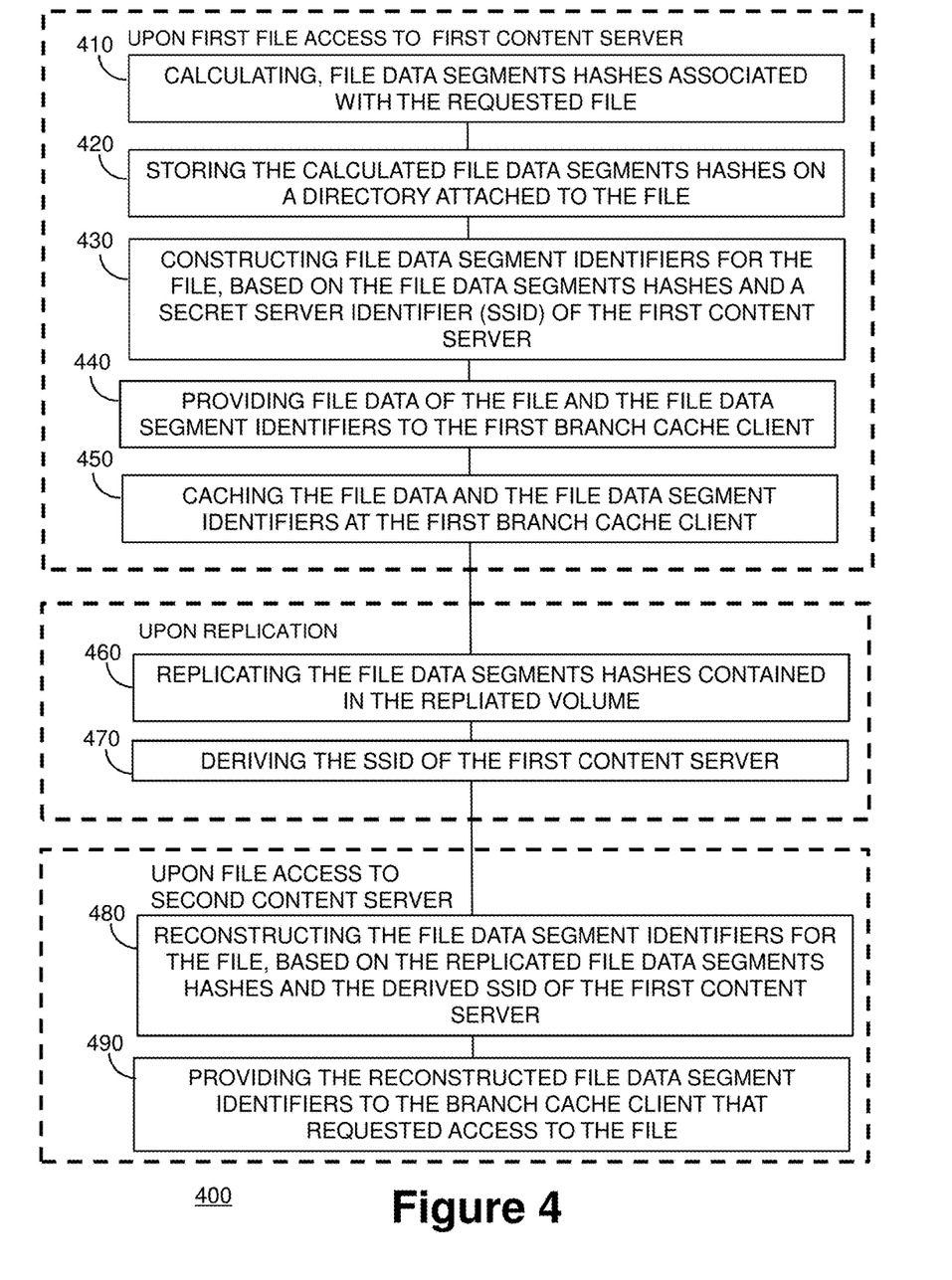
FIG. 4 is a high level flowchart illustrating non-limiting exemplary method in accordance with some embodiments of the present invention.

FIG. 4 is a high level flowchart illustrating a non-limiting exemplary method in accordance with some embodiments of the present invention. Method 400 may include the following steps: upon a first access request for a file, made by a first branch cache client to a first content server: calculating, file data segments hashes associated with the file 410; storing the calculated file data segments hashes on a directory attached to the file 420; constructing file data segment identifiers for the file, based on the file data segments hashes and a secret server identifier (SSID) of the first content server 430; providing file data of the file and the file data segment identifiers to the first branch cache client 440; caching the file data and the file data segment identifiers at the first branch cache client 450; upon replicating a volume containing the file, from the first content server to a second content server: replicating the file data segments hashes contained in the replicated volume 460; deriving the SSID of the first content server 470; upon an access request for the file made by the first branch cache client or any other any branch cache client to the second content server: reconstructing the file data segment identifiers for the file, based on the replicated file data segments hashes and the derived SSID of the first content server 480; and providing the reconstructed file data segment identifiers to the branch cache client that requested access to the file 490.

In accordance with some embodiments of the present invention, method 400 may be implemented by a non-transitory computer readable medium that includes a set of instructions, that when executed, cause the least one computer processor to: upon a first access request for a file, made by a first branch cache client to: calculate file data segments hashes associated with the file; store the calculated file data segments hashes on a directory attached to the file; construct file data segment identifiers for the file, based on the file data segments hashes and a secret server identifier (SSID) of the first content server; provide file data of the file and the file data segment identifiers to the first branch cache client; and cache the file data and the file data segment identifiers; upon replicating a volume containing the file, from the first content server to the second content server: receive replicated the file data segments hashes contained in the replicated volume; and derive the SSID of the first content server; and upon an access request for the file made by the first branch cache client or any other branch cache client to the second content server: reconstruct the file data segment identifiers for the file, based on the replicated file data segments hashes and the derived SSID of the first content server; and provide the reconstructed file data segment identifiers to the branch cache client that requested access to the file.

In order to implement the method according to some embodiments of the present invention, a computer processor may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory based solid state disks (SSDs) and also magneto-optic storage devices.

As will be appreciated by one skilled in the art, some aspects of the present invention may be embodied as a system, method or computer program product. Accordingly, some aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, some aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to some embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function (s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only. The principles and uses of the teachings of the present invention may be better understood with reference to the accompanying description, figures and examples.

It is to be understood that the details set forth herein do not construe a limitation to an application of the invention. Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included. Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described. Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs. The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein. Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for preserving branch cache file data segment identifiers upon volume replication, the method comprising:
   upon a first access request for a file, made by a first branch cache client to a first content server:
      calculating, file data segments hashes associated with said file;
      storing the calculated file data segments hashes on a directory attached to said file;

constructing file data segment identifiers for said file, based on the file data segments hashes and a secret server identifier (SSID) of the first content server;
providing file data of said file and the file data segment identifiers to the first branch cache client; and
caching the file data and the file data segment identifiers at the first branch cache client;
upon replicating a volume containing said file, from the first content server to a second content server:
replicating said file data segments hashes contained in the replicated volume; and
deriving the SSID of the first content server;
upon an access request for said file made by the first branch cache client or any other any branch cache client to the second content server:
reconstructing the file data segment identifiers for said file, based on the replicated file data segments hashes and the derived SSID of the first content server; and
providing the reconstructed file data segment identifiers to the branch cache client that requested access to the file.

2. The method according to claim 1, wherein upon promoting the replicated volume at the second content server to a primary storage, using the SSID of the second content server instead of the derived SSID of the first content server.

3. The method according to claim 1, wherein upon said access request for said file made by the first branch cache client or any other any branch cache client to the second content server, using the file data cached at the first branch cache client only in a case that the cached file data segment identifiers and the reconstructed file data segment identifiers provided by the second content server are identical.

4. The method according to claim 1, wherein the first content server is a distributed file system wherein said file is associated with one of a plurality of clusters, and wherein the SSID of the first content server is constructed based on an identifier of the cluster associated with said file, and an identifier of the volume containing said file.

5. The method according to claim 1, wherein the deriving the SSID of the first content server is achieved by replicating the SSID of the first content upon the replicating of the volume containing said file.

6. The method according to claim 1, wherein the calculating, the storing, and the constructing are carried out at the first content server.

7. The method according to claim 1, wherein the calculating, the storing, and the constructing are repeated whenever said file is modified.

8. A system for preserving branch cache file data segment identifiers upon volume replication, the system comprising:
a first content server, configured, upon a first access request for a file, made by a first branch cache client to:
calculate, file data segments hashes associated with said file;
store the calculated file data segments hashes on a directory attached to said file;
construct file data segment identifiers for said file, based on the file data segments hashes and a secret server identifier (SSID) of the first content server; and
provide file data of said file and the file data segment identifiers to the first branch cache client;
a first branch cache client configured to cache the file data and the file data segment identifiers; and
a second content server configured, upon replicating a volume containing said file, from the first content server to the second content server:
receive replicated said file data segments hashes contained in the replicated volume; and
derive the SSID of the first content server,
wherein upon an access request for said file made by the first branch cache client or any other any branch cache client to the second content server, the second content server is configured to:
reconstruct the file data segment identifiers for said file, based on the replicated file data segments hashes and the derived SSID of the first content server; and
provide the reconstructed file data segment identifiers to the branch cache client that requested access to the file.

9. The system according to claim 8, wherein upon promoting the replicated volume at the second content server to a primary storage, the second content server is configured to use the SSID of the second content server instead of the derived SSID of the first content server.

10. The system according to claim 8, wherein upon said access request for said file made by the first branch cache client or any other any branch cache client to the second content server, the branch cache clients are configured to use the file data cached at the first branch cache client only in a case that the cached file data segment identifiers and the reconstructed file data segment identifiers provided by the second content server are identical.

11. The system according to claim 8, wherein the first content server is a distributed file system wherein said file is associated with one of a plurality of clusters, and wherein the SSID of the first content server is constructed based on an identifier of the cluster associated with said file, and an identifier of the volume containing said file.

12. The system according to claim 8, wherein the deriving the SSID of the first content server is achieved by replicating the SSID of the first content upon the replicating of the volume containing said file.

13. The system according to claim 8, wherein the first content server is configured to repeat the calculating, the storing, and the constructing whenever said file is modified.

14. A non-transitory computer readable medium for preserving branch cache file data segment identifiers upon volume replication, the computer readable medium comprising a set of instructions that when executed cause at least one computer processor to:
upon a first access request for a file, made by a first branch cache client to:
calculate file data segments hashes associated with said file;
store the calculated file data segments hashes on a directory attached to said file;
construct file data segment identifiers for said file, based on the file data segments hashes and a secret server identifier (SSID) of the first content server;
provide file data of said file and the file data segment identifiers to the first branch cache client; and
cache the file data and the file data segment identifiers;
upon replicating a volume containing said file, from the first content server to the second content server:
receive replicated said file data segments hashes contained in the replicated volume; and
derive the SSID of the first content server; and
upon an access request for said file made by the first branch cache client or any other branch cache client to the second content server:
reconstruct the file data segment identifiers for said file, based on the replicated file data segments hashes and the derived SSID of the first content server; and provide the reconstructed file data segment identifiers to the branch cache client that requested access to the file.

15. The non-transitory computer readable medium according to claim 14, further comprising a set of instructions that when executed cause at least one computer processor, upon promoting the replicated volume at the second content server to a primary storage, to use the SSID of the second content server instead of the derived SSID of the first content server.

16. The non-transitory computer readable medium according to claim 14, further comprising a set of instructions that when executed cause at least one computer processor, upon said access request for said file made by the first branch cache client or any other any branch cache client to the second content server, to obtain by the branch cache clients the file data cached at the first branch cache client only in a case that the cached file data segment identifiers and the reconstructed file data segment identifiers provided by the second content server are identical.

17. The non-transitory computer readable medium according to claim 14, wherein the first content server is a distributed file system wherein said file is associated with one of a plurality of clusters, and wherein the SSID of the first content server is constructed based on an identifier of the cluster associated with said file, and an identifier of the volume containing said file.

18. The non-transitory computer readable medium according to claim 14, wherein the deriving the SSID of the first content server is achieved by replicating the SSID of the first content upon the replicating of the volume containing said file.

19. The non-transitory computer readable medium according to claim 14, further comprising a set of instructions that when executed cause at least one computer processor to: repeat the calculating, the storing, and the constructing whenever said file is modified.

* * * * *